(12) United States Patent
Dunbar

(10) Patent No.: US 10,207,866 B1
(45) Date of Patent: *Feb. 19, 2019

(54) LOAD MONITORING SYSTEM USING ACCELERATION OF THE VEHICLE FOR WASTE SERVICE VEHICLE

(71) Applicant: Rubicon Global Holdings, LLC, Atlanta, GA (US)

(72) Inventor: Hunter Dane Dunbar, Waconia, MN (US)

(73) Assignee: RUBICON GLOBAL HOLDINGS, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/933,136

(22) Filed: Mar. 22, 2018

(51) Int. Cl.
| | |
|---|---|
| G08B 21/00 | (2006.01) |
| B65F 3/00 | (2006.01) |
| H04Q 9/00 | (2006.01) |
| G01G 19/08 | (2006.01) |
| G01F 17/00 | (2006.01) |

(52) U.S. Cl.
CPC ............... *B65F 3/00* (2013.01); *G01F 17/00* (2013.01); *G01G 19/08* (2013.01); *H04Q 9/00* (2013.01); *H04Q 2209/823* (2013.01); *H04Q 2209/84* (2013.01)

(58) Field of Classification Search
CPC ........ G08B 21/182; G08B 5/36; G01G 15/00; B66F 17/00

USPC ...................................................... 340/870.07
See application file for complete search history.

(56) References Cited

U.S. PATENT DOCUMENTS

| | | | | | |
|---|---|---|---|---|---|
| 5,347,092 | A | * | 9/1994 | Buchs ...................... | G01G 7/04 177/212 |
| 5,837,945 | A | * | 11/1998 | Cornwell .................. | B65F 3/04 177/136 |
| 5,994,650 | A | * | 11/1999 | Eriksson .................. | B66F 9/122 177/141 |
| 2006/0293815 | A1 | * | 12/2006 | McCann .......... | B60G 17/01908 701/37 |
| 2007/0268759 | A1 | * | 11/2007 | Sabino .................. | B65F 1/1484 365/192 |
| 2014/0379588 | A1 | * | 12/2014 | Gates ................. | G06Q 10/0631 705/308 |
| 2016/0377445 | A1 | * | 12/2016 | Rodoni .................. | G01C 21/36 701/428 |

\* cited by examiner

*Primary Examiner* — Mark S Rushing
(74) *Attorney, Agent, or Firm* — Rock IP, PLLC

(57) ABSTRACT

A system is disclosed for monitoring waste collected by a service vehicle. The system may include a sensor configured to generate an acceleration signal indicative of an acceleration of the service vehicle, an output device, and a controller in communication with the sensor and the output device. The controller may be configured to receive the acceleration signal from the sensor after collection of the waste from a service stop. The controller may be further configured to determine an amount of the waste collected by the service vehicle from the service stop based on the acceleration signal, and to relay the amount of the waste to the output device.

20 Claims, 3 Drawing Sheets

LOAD MONITORING SYSTEM USING ACCELERATION OF THE VEHICLE FOR WASTE SERVICE VEHICLE

TECHNICAL FIELD

The present disclosure relates generally to a monitoring system and, more particularly, to a system for monitoring loading of a waste service vehicle.

BACKGROUND

Service vehicles have been used in the waste industry to collect waste from a receptacle (e.g., from a dumpster or a wheeled tote) and to transport the waste to a final disposition location. A conventional service vehicle includes forks or arms that extend forward, rearward, and/or to the side of a bed. The forks engage corresponding features (e.g., pockets or slots) formed in each receptacle, such that the receptacle can be lifted and dumped into the bed. In some embodiments, a hydraulic circuit is operatively connected to the forks, such that the forks and receptacle can be moved with reduced effort.

It can be important to gather information about the receptacle and/or the waste collected from the receptacle during servicing. For example, some service providers bill their customers based on an amount of waste (e.g., a weight of the waste) collected from each customer's receptacle. In another example, compliance with particular regulations (e.g., roadway regulations, emissions regulations, recycling regulations, hazardous waste regulations, etc.) requires that information be collected in association with waste discarded by particular customers and/or transported to particular final disposition locations. In these examples (and in other examples), the information is collected by way of one or more sensors mounted to the service vehicle. For example, a strain gauge could be mounted in the bed of the service vehicle or to a strut supporting the bed and used to measure a change in payload of the service vehicle due to service at a particular customer location. In another example, a pressure sensor could be associated with the hydraulic circuit that is connected to the forks of the vehicle and used to measure a change in hydraulic pressure associated with an engaged receptacle. In yet another example, the vehicle is driven over a set of scales that measure a combined weight of the service vehicle and collected waste.

Although the conventional sensors used to measure the waste collected by service vehicles may be appropriate for some applications, they can also be expensive, slow to respond, inaccurate, inconvenient, and/or mounted in exposed areas that make them prone to damage. The disclosed system is directed to overcoming one or more of the problems set forth above and/or other problems of the prior art.

SUMMARY

In one aspect, the present disclosure is directed to a system for monitoring waste collected by a service vehicle. The system may include a sensor configured to generate an acceleration signal indicative of an acceleration of the service vehicle, an output device, and a controller in communication with the sensor and the output device. The controller may be configured to receive the acceleration signal from the sensor after collection of the waste from a service stop. The controller may be further configured to determine an amount of the waste collected by the service vehicle from the service stop based on the acceleration signal, and to relay the amount of the waste to the output device.

In another aspect, the present disclosure is directed to another system for monitoring waste collected by a service vehicle. This system may include a sensor configured to generate an acceleration signal indicative of an acceleration of the service vehicle during takeoff from a service stop, and a locating device configured to generate a location signal indicative of a location of the service vehicle. The system may further include an output device, and a controller in communication with the sensor, the locating device, and the output device. The controller may be configure to receive the acceleration signal from the sensor after collection of the waste from the service stop, and to determine a weight of the waste collected by the service vehicle from the service stop based on the acceleration signal. The controller may further be configured to link an identification of the service stop with the weight of the waste collected by the service vehicle from the service stop, and to relay the weight of the waste and the identification of the service stop to the output device.

In yet another aspect, the present disclosure is directed to a method of monitoring waste collected by a service vehicle. The method may include generating a signal indicative of an acceleration of the service vehicle after departure from a service stop, and determining an amount of the waste collected by the service vehicle from the service stop based on the acceleration signal. The method may further include relaying the amount of the waste to an output device.

DETAILED DESCRIPTION

Figure 1:
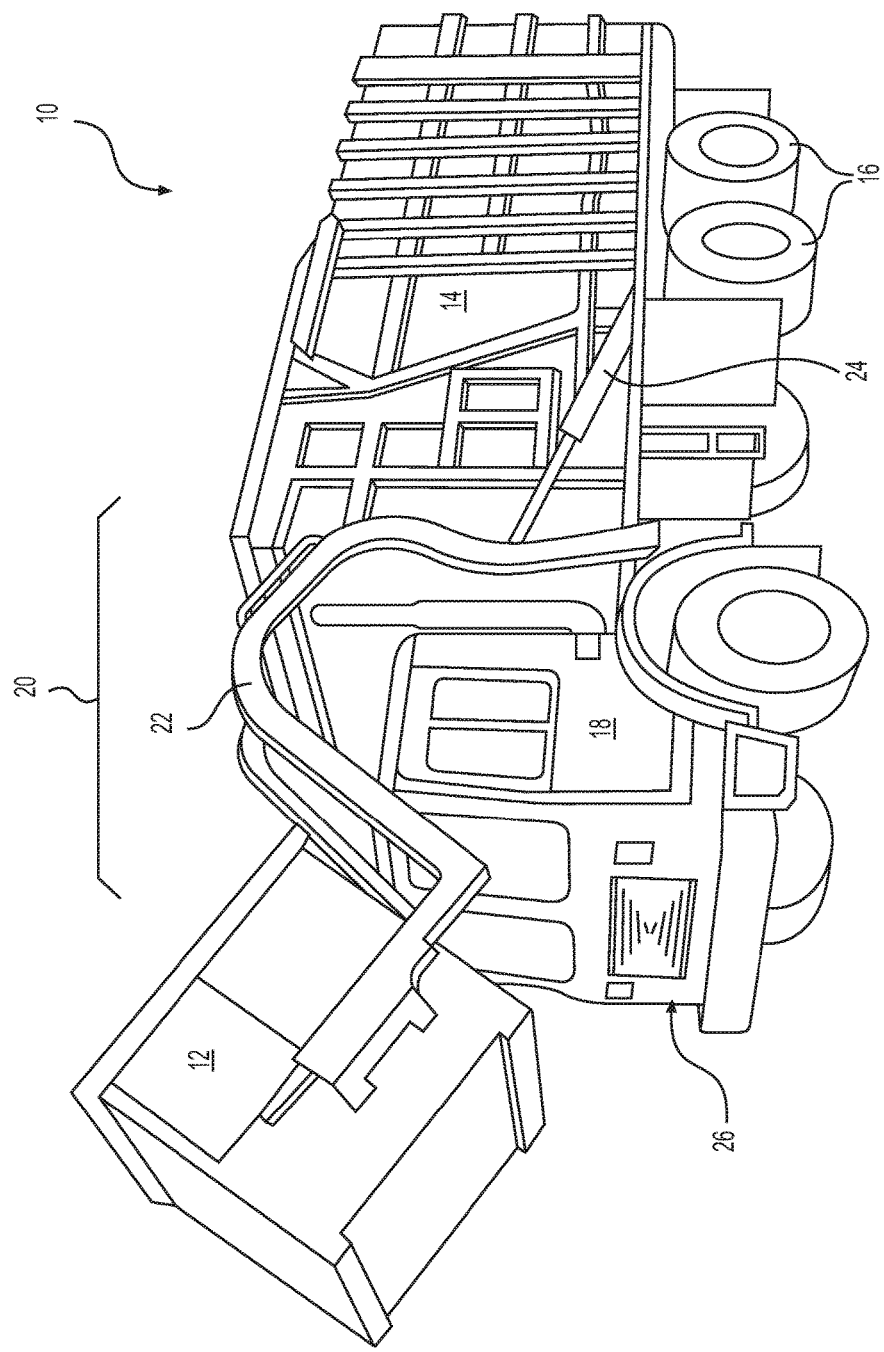
FIG. 1 is an isometric illustration of an exemplary disclosed waste service vehicle.

FIG. 1 illustrates an exemplary waste service vehicle 10 that is configured to service a receptacle 12. The service may include, for example, the removal of waste materials from inside of receptacle 12, the removal of receptacle 12, and/or the placement of new or additional receptacles 12 at a particular customer location.

Service vehicle 10 may take many different forms. In the example shown in FIG. 1, service vehicle 10 is a hydraulically actuated, front-loading type of service vehicle. Specifically, service vehicle 10 may include a bed 14 supported by a plurality of wheels 16, a cab 18 located forward of bed 14, and a lifting device 20 extending forward of cab 18. Lifting device 20 may consist of, among other things, one or more lift arms 22 that are configured to engage and/or grasp receptacle 12, and one or more actuators 24 connected to lift arms 22. Actuators 24 may be powered (e.g., by pressurized oil) to raise lift arms 22 and receptacle 12 up past cab 18 to a dump location over bed 14. After dumping of receptacle 12, actuator(s) 24 may allow lift arms 22 and receptacle 12 to lower back to the ground in front of service vehicle 10.

In another example (not shown), service vehicle 10 may be a flatbed or roll-off type of service vehicle. Specifically, lifting device 20 may extend rearward of cab 18 and be powered to raise receptacle 12 up onto bed 14 for transportation of receptacle 12 away from the environment. After dumping of receptacle 12 at a landfill (or swapping of a full receptacle 12 for an empty receptacle 12), receptacle 12 may be returned to the service location and lowered back to the ground behind service vehicle 10. In other examples (not shown), lifting device 20 may be located to pick up receptacles 12 from a side of service vehicle 10. Other configurations (e.g., manual-loading configurations) may also be possible.

Figure 2:
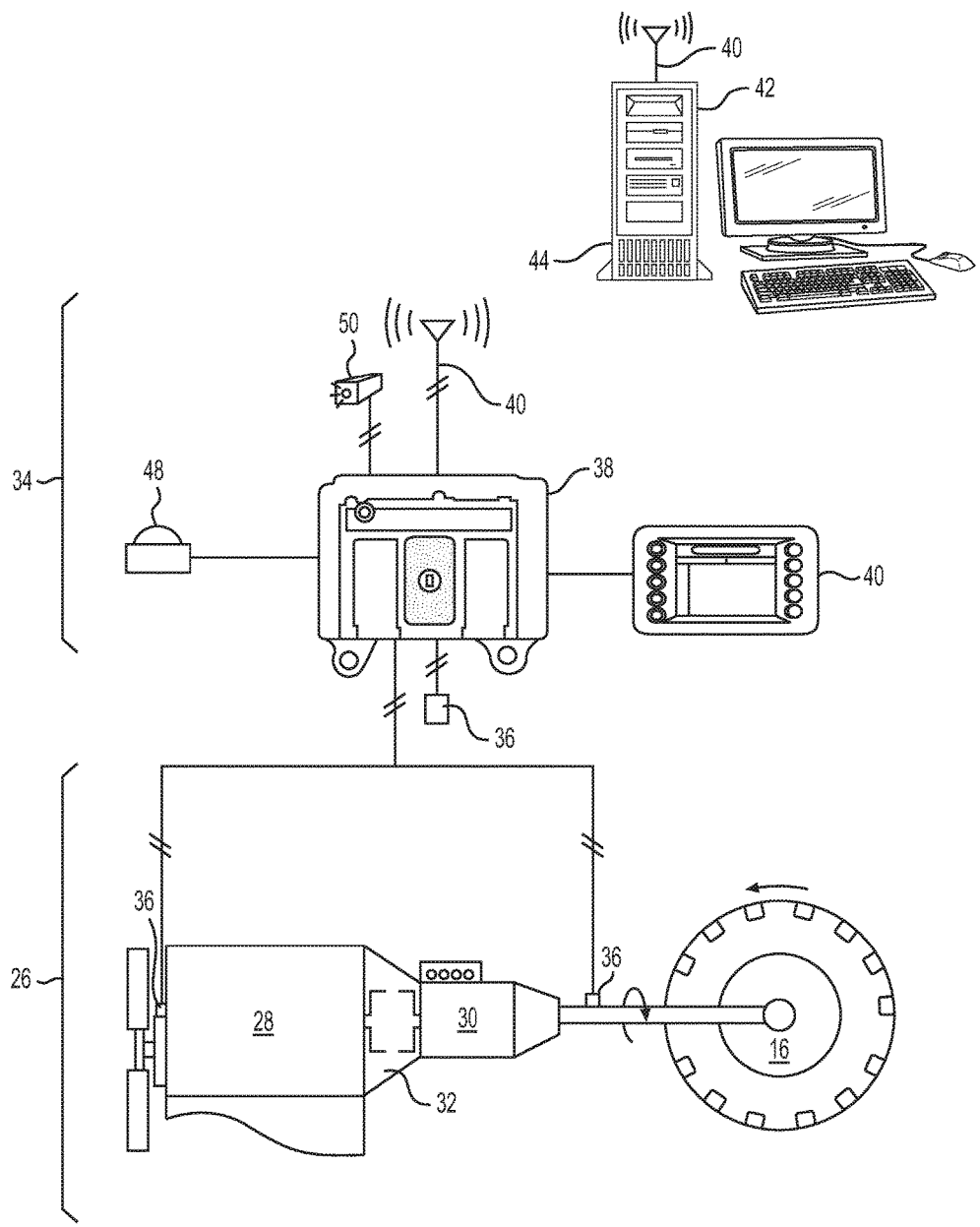
FIG. 2 is a diagrammatic illustration of an exemplary disclosed load monitoring system for use with the waste service vehicle of FIG. 1.

Service vehicle 10 may include a powertrain 26 that provides power to rotate wheels 16 and to cause actuators 24 to extend and lift receptacle 12. As shown in FIG. 2, powertrain 26 may include, among other things, a power source 28 and a transmission 30. In one embodiment, power source 28 is a combustion type of engine, for example, a diesel engine, a gasoline engine, or a gaseous-fuel powered engine that is configured to combust a fuel and generate a corresponding mechanical power output. In another embodiment, power source 28 is a non-combustion type of power source, for example an electric motor that receives electrical power input from a battery, a solar cell, and/or a fuel cell and generates a corresponding mechanical power output. Transmission 30 may be connected to the mechanical power output of power source 28 (e.g., via a torque converter 32), and itself include an output that can be connected to one or more of wheels 16. Transmission 30 may embody a mechanical speed-shift transmission, a hydraulic transmission, an electric transmission, or a hybrid transmission having any combination of mechanical, hydraulic, and/or electric components.

As will be described in more detail below, performance of service vehicle 10 may be at least partially dependent on an amount (e.g., a weight) of material loaded into bed 14 (referring to FIG. 1). For example, powertrain 26 may accelerate vehicle 10 slower and/or require a greater amount of fuel or electrical power input for the same acceleration when bed 14 is loaded with a greater amount of waste material. In another example, vehicle 10 may pitch, roll, and/or yaw to a greater degree during takeoff, stopping, and/or cornering with a heavier load. In either example, the loading of bed 14 may be estimated based, at least in part, on detected accelerations of vehicle 10 in one or more directions, and/or a timing at which the accelerations occur.

As further shown in FIG. 2, service vehicle 10 may be provided with a load monitoring system ("system") 32 that can be used to track loading of bed 14 (e.g., to track an amount of waste dumped into or otherwise loaded onto bed 14 at each service stop) based at least partially on one or more of the accelerations discussed above. System 34 may include, among other things, at least one sensor 36 configured generate signals indicative of the accelerations, a controller 38 in communication with sensor 36 and configured to estimate the loading of bed 14 based on the signals, and at least one output device 40 used by controller 38 to relay loading information to an onboard operator and/or to an offboard controller 42 located at a back office 44.

In one embodiment, sensor 36 is a conventional rotation detector having a stationary element rigidly connected to frame of service vehicle 10 that is configured to sense a relative rotational movement of powertrain 26 (e.g., a rotation of power source 28, a rotation of torque converter 32, a rotation of transmission 30, a rotation of wheel 16, and/or a rotation of any intermediate component connecting these devices to each other). In the depicted example, the stationary element is a magnetic or optical element that detects the rotation of an indexing element (e.g., a toothed tone wheel, an imbedded magnet, a calibration stripe, teeth of a timing gear, a cam lobe, etc.) connected to rotate with powertrain 26. The stationary element of sensor 36 may be located adjacent the indexing element and configured to generate a signal each time the indexing element (or a portion thereof, e.g., a tooth) passes near the stationary element. This signal may be directed to controller 38, and controller 38 may use this signal (e.g., a frequency of signal receipt) to determine an acceleration of powertrain 26 relative to the stationary element of sensor 36.

In another embodiment, sensor 36 is an auditory and/or vibrational type sensor (e.g., a microphone or accelerometer) configured to remotely detect the rotational acceleration of powertrain 26 (e.g., without direct access to any rotating components) and generate corresponding signals. For example, sensor 36 may be able to receive sound waves transmitted through the air and/or through a framework of service vehicle 10 that are generated by power source 28, torque converter 32, transmission 30, wheels 16, etc., and convert the sound waves to electrical impulses directed to controller 38.

In yet another embodiment, sensor 36 is a single- or multi-axis accelerometer configured to generate signals indicative of linear acceleration, roll, pitch, and/or yaw of vehicle 10 (e.g., of bed 14). For example, sensor 36 may be configured to detect a rate of change of velocity of bed 14 in the X-, Y-, and/or Z-directions, and to generate corresponding signals. In any of the above-discussed embodiments, any one or more of sensor(s) 36, controller 38, and output device 40 could be integrally formed and/or packaged together in a handheld device (e.g., a smartphone or tablet carried by the operator, a sensing module permanently or temporarily mounted to service vehicle 10, etc.), as desired.

Controllers 38 and 42 may each include means for monitoring, recording, storing, indexing, processing, interpreting, and/or communicating information based on the signals generated by sensor(s) 36. These means may include, for example, a memory, one or more data storage devices, a central processing unit, or any other component that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

In one embodiment, controller 38 may be configured to determine loading of bed 14 (e.g., a weight of the waste loaded into bed 14) based at least in part on the signal(s) generated by sensor(s) 36. Controller 38 may then cause a representation of the weight to be relayed directly to the operator via output device 40.

In another embodiment, the signals generated by sensor(s) 36 may first be directed offboard service vehicle 10, prior to interpretation of the signals. Specifically, controller 38 may only gather the signals, packetize the signals, filter the signals, and/or buffer the signals, and then transmit the signals offboard (e.g., via output device 40) to controller 42 for remote interpretation at back office 44.

In either embodiment, the appropriate controller (i.e., controller 38 and/or controller 42) may be configured to utilize the signal(s) generated by sensor(s) 36 only when the signal(s) have values above a predefined threshold and/or within an expected range. For example, only when the signals indicate that at least a minimum weight (e.g., at least 25 lbs.) has been loaded into bed 14, will the corresponding controller(s) record and/or cause corresponding information to be displayed. This may help to avoid errors in tracking the weight of collected materials.

Output device 40 may embody any type of device known in the art for relaying weight-related information to a user. In one embodiment, output device 40 is a visual display (e.g., a liquid crystal display (LCD), a cathode ray tube (CRT), a personal digital assistant (PDA), a plasma display, a touch-screen, a portable hand-held device, or any such display device known in the art) configured to actively and responsively show a change in weight and/or a total weight of bed 14 to the operator of service vehicle 10. The display may be connected to controller 38, and controller 38 may execute instructions to render graphics and images on the display that are associated with loading of bed 14. In another embodiment, output device 40 is a communication device configured to relay the information to a remote location (e.g., to back office 44). As a communication device, output device 40 may include hardware and/or software that enable the sending and/or receiving of data messages through a communications link. The communications link may include satellite, cellular, infrared, radio, and any other type of wireless communications.

It is contemplated that output device 40, in addition to relaying weight-related information, could also be used to provide a way for an operator of service vehicle 10 to input observances made while traveling around the environment. For example, the operator may be able to enter a type and/or condition of waste observed at a particular location, an amount of waste in or around receptacle 12, a fill status of a particular receptacle 12 and/or bed 14, a condition of receptacle 12, a location of receptacle 12, a type of waste material being transported, an end-disposition location of the waste material, and/or other information about receptacle 12 and the waste engaged by, loaded into, or otherwise processed by service vehicle 10. The information may be input in any number of ways, for example via a touch screen interface, via one or more buttons, via a keyboard, via speech recognition, or in another manner known in the art.

In some instances, the weight information generated by controller 38 may be linked (e.g., by controller 38, controller 42, and/or an operator of service vehicle 10) to a particular service location. The service location may be manually determined and input by the operator of service vehicle 10 (e.g., via output device 40), or automatically determined or received by controller 38 (e.g., based on a location detected by a locating device 48).

Locating device 48 may be configured to generate signals indicative of a geographical position and/or orientation (e.g., the X-, Y-, and/or Z-stance) of service vehicle 10 relative to a local reference point, a coordinate system associated with a local waste environment, a coordinate system associated with Earth, or any other type of 2-D or 3-D coordinate system. For example, locating device 48 may embody an electronic receiver configured to communicate with satellites, or a local radio or laser transmitting system used to determine a relative geographical location of itself. Locating device 48 may receive and analyze high-frequency, low-power radio or laser signals from multiple locations to triangulate a relative 3-D geographical position and orientation. In some embodiments, locating device 48 may also be configured to determine a location and/or orientation of a particular part of service vehicle 10, for example of bed 14 (referring to FIG. 1). Based on the signals generated by locating device 48 and based on known kinematics of service vehicle 10, controller 38 may be able to determine in real time, the position, heading, travel speed, linear acceleration, orientation, and/or angular acceleration of service vehicle 10. This information may then be used by controller 38 and/or controller 42, for example, to initiate the weight determination algorithm described above, and/or to attribute the information to a particular service location within an electronic map or database of the environment.

It is contemplated that locating device 48 may take another form, if desired. For example, locating device 48 could be an RFID reader configured to interact with an RFID tag located within a surrounding environment (e.g., at a customer location, on receptacle 12, etc.), or another type of scanner configured to read another type of indicia (e.g., a barcode) within the environment. Based on the reading of the RFID tag or other indicia, the location and/or orientation of service vehicle 10 may be linked to the known location of the RFID tag or other indicia within the environment.

It is also contemplated that, in some embodiments, in addition to estimating an amount of waste dumped into bed 14 at a particular service location, controller(s) 38 and/or 42 may additionally be able to determine a general type of the waste. This determination may be made, at least in part, based on a known volume of the waste and the estimated weight. In particular, the appropriate controller may be able to determine the waste type based on a density comparison of the collected waste and expected or reference materials. For example, when a calculated density of the collected waste is within a first range, the controller may determine that the waste is made up of primarily recyclables; when within a second range, primarily organic matter; etc.

The volume of the collected waste may become known based on signals generated by one or more optional volume sensors 50. Exemplary volume sensors include cameras, LIDAR sensors, RADAR sensors, and other sensors known in the art that may be associated with an interior of bed 14 and/or receptacle 12. Sensors 50 may generate volume signals directed to controller 38 for further processing.

Figure 3:
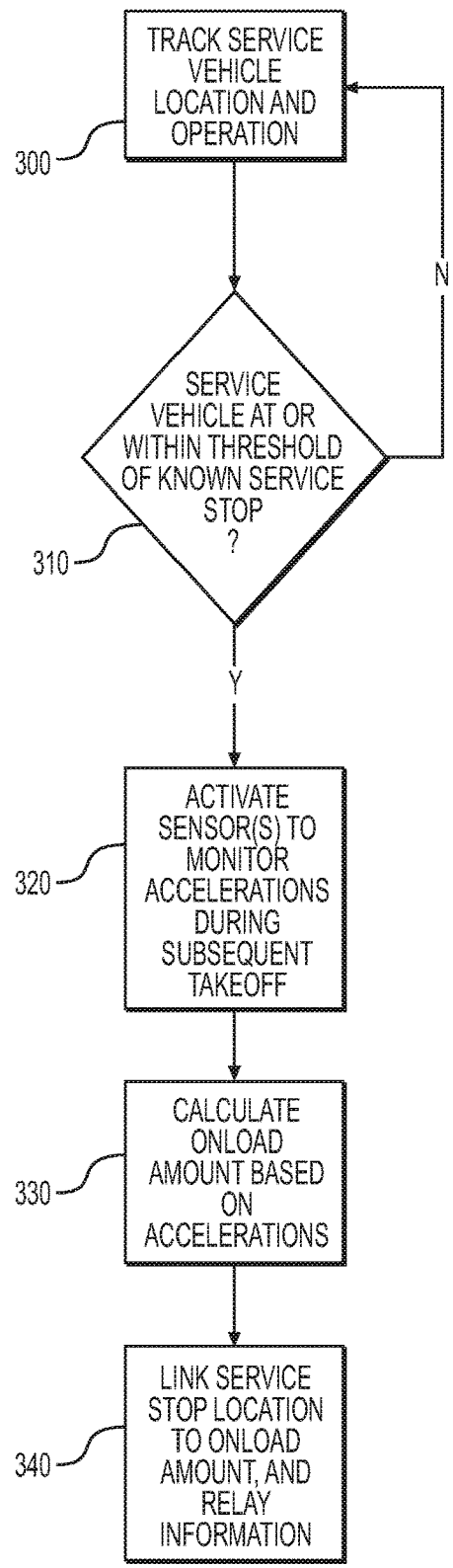
FIG. 3 is a flowchart illustrating an exemplary disclosed method of operation that may be performed by the load monitoring system of FIG. 2.

FIG. 3 illustrates a flowchart associated with an exemplary method of operating service vehicle 10 that may be performed by controller 38. FIG. 3 will be described in more detail below to further illustrate the disclosed concepts.

INDUSTRIAL APPLICABILITY

The disclosed system may be applicable to the waste service industry, where service-monitoring can affect profitability and efficiency. The disclosed system may be used to automatically monitor an amount of waste collected by a service vehicle from a particular location. Operation of the disclosed system will be described, with reference to FIG. 3.

As shown in FIG. 3, operation of system 34 may begin with tracking of service vehicle location and operation (Step 300). In particular, as service vehicle 10 moves about the environment (referring to FIG. 1), the location of service vehicle 10 may be tracked via locating device 48 (referring to FIG. 2). This information may then be used by controller 38 to determine if service vehicle 10 is at or within a threshold vicinity of a known service stop (e.g., based on a listing of known service stops and associated coordinates stored in memory) (Step 310). Control may cycle through Steps 300 and 310, until controller 38 determines that service vehicle 10 is at or near a stop at which service vehicle 10 is tasked with collecting waste (e.g., raising and emptying receptacle 12 into bed 14).

It is contemplated that controller 38 may determine the arrival of service vehicle 10 at a service stop in another manner, if desired. For example, the operator of service vehicle 10 may provide manual input (e.g., via device 40) indicative of the arrival. In another example, the scanning of an RFID tag (e.g., via locating device 48) on a receptacle to-be-serviced may also or alternatively provide the indication of arrival at a particular service stop.

Regardless of the way in which controller 38 determines arrival at the service stop, controller 38 may thereafter activate sensor(s) 36 to monitor an acceleration of vehicle 10 during subsequent travel away (e.g., takeoff) from the service stop (Step 320). This may include monitoring of a rotational acceleration of powertrain 26 (e.g., of power source 28, torque converter 32, transmission 30, wheels 16, etc.). Alternatively, or additionally, the acceleration monitoring of Step 320 may include collection of X-, Y-, and/or Z-motion of vehicle 10 (e.g., of bed 14) via sensor(s) 36 and/or locating device 48 during takeoff from the service stop. In some embodiments, the acceleration data may be collected only during takeoff (e.g., for only a predefined period of time and/or a travel distance after leaving the service stop location). In other embodiments, however, the acceleration data may be collected starting with departure of service vehicle 10 from the service stop until arrival of service vehicle 10 at a subsequent service stop and/or disposal location. In either situation, it is contemplated that, rather than activating sensor(s) 36 at Step 320, sensor(s) 36 may always be active and controller 38 may simply receive, record, interpret, and/or utilize the signals generated by sensor(s) 36 at Step 320.

Controller 38 may utilize the signal(s) generated by sensor(s) 36 to determine an amount of waste onloaded at the service stop that vehicle 10 just left (Step 330). As described above, controller 38 may determine the amount of waste loaded into bed 14 at the service stop as a function of the acceleration(s) monitored when leaving the service stop. The acceleration(s) of vehicle 10 may vary according to the amount of onloaded waste, and these variations may be calibrated (e.g., via lab and/or field calibration comparisons with directly measured weights of the waste) to ensure a desired level of accuracy in the weight estimations.

For example, during operation of service vehicle 10, when service vehicle 10 is empty and taking off from a stopped condition, vehicle 10 may be capable of accelerating at a known rate (e.g., a rate known for a specific vehicle, determined over a period of time, and accounting for aging, wear, operator influence, etc.) for a given amount of fuel and/or electrical input to powertrain 26. Likewise, when service vehicle 10 is empty and cornering or braking, vehicle 10 may pitch, roll, and/or yaw at a known rate (e.g., a rate known for a specific vehicle, determined over a period of time and accounting for aging, wear, operator influence, etc.) for a turn radius, travel speed, and/or linear acceleration of vehicle 10. As bed 14 is loaded with more waste material, vehicle 10 may linearly accelerate, pitch, roll, and/or yaw differently, and controller 38 may be configured to quantify these differences and correlate them to an amount of increased loading.

Controller 38 may then link the onloaded amount of waste determined at Step 330 to a location (e.g., to an identity, address, and/or coordinates) of the service stop that vehicle 10 just left, and relay the information to the user (e.g., to the operator or a back-office manager) via one or more of output devices 40 (Step 340). For example, controller 38 may cause an indication of a weight of the onloaded waste to be displayed on output device 40, along with the location information. In another example, controller 38 may wirelessly communicate just the signals or the weight and location information offboard service vehicle 10 (e.g., to controller 42 at back office 44).

In some embodiments, controller 38 may link the weight of the waste determined at Step 330 to the service stop location and/or relay the associated information to output device 40 only when the weight exceeds a minimum threshold value. The minimum threshold value may be, for example, a fixed weight (e.g., about 25 lbs).

As described above, it may be possible to additionally determine a type of the onloaded waste, if desired. For example, controller 38 and/or 42 may be configured to use the weight information obtained from sensor(s) 36, along with volume information obtainable via volume sensor(s) 50, to determine a density of the onloaded waste. The density may then be compared to one or more density values and/or ranges of known types of waste, in order to determine a type and/or mix of waste onloaded at the each service stop. This information may then be relayed to the operator and/or back office, along with the weight information, at Step 340.

The disclosed system may provide a way to accurately determine the amount and/or type of waste collected at each stop made by service vehicle 10 in an inexpensive and robust manner. In particular, because the disclosed system may utilize common sensor(s) often already in use on service vehicle 10 for other purposes, the cost of the system may be low. In addition, because the sensor(s) may be located remote from where the waste is collected, the sensor(s) may be protected from impacts and contamination that could degrade the accuracy and/or longevity of system 34.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for monitoring waste collected by a service vehicle, comprising:
   a sensor configured to generate an acceleration signal indicative of an acceleration of a powertrain of the service vehicle;
   an output device; and
   a controller in communication with the sensor and the output device, the controller being configured to:
   receive the acceleration signal from the sensor after collection of the waste from a service stop;
   determine an amount of the waste collected by the service vehicle from the service stop based on the acceleration signal; and
   relay the amount of the waste to the output device.

2. The system of claim 1, wherein the acceleration signal is associated with linear travel of the service vehicle from the service stop to a subsequent service stop.

3. The system of claim 1, wherein the acceleration signal is associated with rotation of a drivetrain component of the service vehicle during travel of the service vehicle from the service stop to a subsequent service stop.

4. The system of claim 1, wherein the acceleration signal is associated with at least one of roll, pitch, and yaw of a bed of the service vehicle during travel of the service vehicle from the service stop to a subsequent service stop.

5. The system of claim 1, further including a volume sensor configured to generate a volume signal indicative of a volume of the waste collected by the service vehicle from the service stop, wherein the controller is further configured to:
   receive the volume signal from the volume sensor;

determine a type of the waste collected by the service vehicle from the service stop based on the amount of the waste and the volume of the waste; and relay the type of the waste to the output device.

6. The system of claim 1, wherein the controller is configured to determine the amount of the waste collected only when the service vehicle is at the service stop.

7. The system of claim 6, further including a locating device configured to generate a location signal indicative of a location of the service vehicle, wherein the controller is configured to determine when the service vehicle is at a service stop based on the location signal.

8. The system of claim 6, further including a device configured to receive input from an operator indicative of a location of the service vehicle, wherein the controller is configured to determine when the service vehicle is at a service stop based on the input.

9. The system of claim 6, wherein the controller is further configured to:

link an identification of the service stop with the amount of the waste collected by the service vehicle from the service stop; and relay the identification along with the amount of the waste to the output device.

10. The system of claim 1, wherein the controller is configured to cause the amount of the waste collected by the service vehicle to be relayed to the output device only when the amount of the waste exceeds a threshold amount.

11. The system of claim 1, wherein the sensor, the output device, and the controller are integrated into a mobile device.

12. A system for monitoring waste collected by a service vehicle, comprising:

a sensor configured to generate an acceleration signal indicative of an acceleration of a powertrain of the service vehicle during takeoff from a service stop;

a locating device configured to generate a location signal indicative of a location of the service vehicle;

an output device; and a controller in communication with the sensor, the locating device, and the output device, the controller being configured to:

receive the acceleration signal from the sensor after collection of the waste from the service stop;

determine a weight of the waste collected by the service vehicle from the service stop based on the acceleration signal;

link an identification of the service stop with the weight of the waste collected by the service vehicle from the service stop; and relay the weight of the waste and the identification of the service stop to the output device.

13. The system of claim 12, further including a volume sensor configured to generate a volume signal indicative of a volume of the waste collected by the service vehicle from the service stop, wherein the controller is further configured to:

receive the volume signal from the volume sensor;

determine a type of the waste collected by the service vehicle from the service stop based on the weight of the waste and the volume of the waste; and relay the type of the waste to the output device.

14. The system of claim 12, wherein the controller is configured to determine the weight of the waste collected only when the locating device indicates that the service vehicle is at the service stop.

15. A method of monitoring waste collected by a service vehicle, comprising:

generating an acceleration signal indicative of an acceleration of a powertrain of the service vehicle after departure from a service stop;

determining an amount of the waste collected by the service vehicle from the service stop based on the acceleration signal; and relaying the amount of the waste to an output device.

16. The method of claim 15, wherein the acceleration signal is associated with linear travel of the service vehicle from the service stop to a subsequent service stop.

17. The method of claim 15, wherein the acceleration signal is associated with rotation of a drivetrain component of the service vehicle during travel of the service vehicle from the service stop to a subsequent service stop.

18. The method of claim 15, wherein the acceleration signal is associated with at least one of roll, pitch, and yaw of a bed of the service vehicle during travel of the service vehicle from the service stop to a subsequent service stop.

19. The method of claim 15, further including:

generating a volume signal indicative of a volume of the waste collected by the service vehicle from the service stop;

determining a type of the waste collected by the service vehicle from the service stop based on the amount of the waste and the volume signal; and relaying the type of the waste to the output device.

20. The method of claim 15, further including:

generating a location signal indicative of a location of the service vehicle; determining the amount of the waste collected only when the service vehicle is at the service stop based on the location signal;

linking an identification of the service stop with the amount of the waste collected by the service vehicle from the service stop; and relaying the identification along with the amount of the waste to the output device.

* * * * *